United States Patent [19]

Sharkitt et al.

[11] 3,780,271

[45] Dec. 18, 1973

[54] ERROR CHECKING CODE AND APPARATUS FOR AN OPTICAL READER

[75] Inventors: Patrick J. Sharkitt, Silver Spring, Md.; Richard R. Hayden, Washington, D.C.

[73] Assignee: Sigma Systems, Inc., Arlington, Va.

[22] Filed: Sept. 29, 1972

[21] Appl. No.: 293,556

[52] U.S. Cl. .................... 235/61.11 E, 235/61.12 R, 340/146.1 AJ 235/61.7 A

[51] Int. Cl. .......................... G06f 11/10, G06k 5/00

[58] Field of Search ......... 340/146.1 AG, 146.1 AJ, 340/146.3 ED; 235/61.7 A, 61.12 R, 61.11 E; 178/23 A

[56] References Cited

UNITED STATES PATENTS

| | | | |
|---|---|---|---|
| 3,249,918 | 5/1966 | Schwenzfeger et al. | 340/146.1 AJ |
| 3,460,117 | 8/1969 | Cohn et al. | 340/146.1 AJ |
| 3,579,185 | 5/1971 | Spruth | 340/146.1 AJ |

*Primary Examiner*—Thomas A. Robinson
*Attorney*—Leo A. Rosetta et al.

[57] ABSTRACT

An error checking code and apparatus for use with an optical reader for reading an octal digital code which contains a data digit field, an error checking count field and a parity field. The reader is designed for self-positioning over a code bearing label and the apparatus comprises a simple logical circuitry to insure the correct reading of the optical code.

14 Claims, 8 Drawing Figures

ERROR CHECKING CODE AND APPARATUS FOR AN OPTICAL READER

BACKGROUND OF THE INVENTION

1. Field of the Invention

The invention is useful in reading coded labels which may be attached to articles or to items which are part of an inventory stock or circulation system such as that of a library. The optical reading apparatus and associated code may be used to identify articles bearing the coded label and is especially adapted to insure accurate reading of the coded label attached to the item.

2. Description of the Prior Art

Hand held readers for reading optically coded cards are known in the prior art and are illustrated in the Mak et al. U.S. Pat. No. 3,238,501 and Milford U.S. Pat. No. 3,581,100. The Mak patent for example discloses a self clocking hand held reader that is manually moved across a card and utilizes a light source and a plurality of light detectors for receiving the reflected light from the coded card. As illustrated in the Mak teaching, it is also known to utilize clocking pulses which are initiated upon the reading of each data bit so that the movement of the optical reader across the code may be non uniform and yet not interfere with the data transfer from the card to the electrical storage elements.

A major drawback in the prior art hand held headers is the tedious and cumbersome procedure for positioning the reader accurately over the code in order to properly align the reader light apertures with the coded rows appearing on the card. Where particular problems occur in alignment it is also necessary to design logic circuitry within the reader to insure that any skew or misalignment of the reader is not processed as a valid data code. The prior art optical readers usually employ a single light source which is utilized to illuminate the reader apertures placed adjacent to the code. In such arrangements, the light source must be relatively strong or the light must be directed toward the aperture by means of light pipes or fiber optical arrangements. The photodetectors which receive the reflected light must also be positioned relatively far away from the aperture surface in order to prevent "shadowing" or blocking the reader openings from the light source. Some readers may utilize optical piping both in transmitting the light to the reader apertures and in transmitting the reflected light to the photodetectors. Such an arrangement is illustrated by the Hanson et al Pat. 3,518,440. The use of light pipes, however, necessitates that the light source must be relatively strong and the photodetectors must be quite sensitive to the reflected light. In addition, light pipes add to the cost and bulk of the reader per se.

The reading of coded information from cards and tapes is well known in the art, and a simple octal coded tape is illustrated in the King U.S. Pat. No. 2,760,404. Many error checking schemes have been developed for the various types of codes utilized. A simple coding scheme incorporating an error checking code in an optical reading apparatus is disclosed by Mak. In more sophisticated code and error detection schemes such as shown in the Schmidt U.S. Pat. No. 3,562,494, the spacing and width of the marks become important to insure an accurate reading. The disadvantage of these systems lies in their complexity and expense. In addition, present day error checking schemes do not provide error detection in a single octal code utilizing the same simple logic circuitry for both data code error checking and parity error checking.

SUMMARY OF THE INVENTION

It is an object of the present invention to provide a new and improved optical reader which is small, compact and inexpensive to fabricate.

It is a further object of the invention to provide a hand held optical reader which is self-aligning on a coded label.

A further object of the invention is to provide an optical reading apparatus for reading an octal coded label having data count error checking features as well as parity error checking features.

A further object of the invention is to provide the operator of the reader with a simple indication of a correct or incorrect label read.

A further object of the instant invention is to provide an optical reading apparatus having a simple and inexpensive logic circuitry for checking the data bit count of each octal row and for checking the parity of the data bit count.

Yet another object of the present invention is to provide an optical reader having separate relatively low power light sources and matched photodetectors for reading each row of coded data.

The instant invention provides an opitcal reader and apparatus for use in reading an octal coded label which may be attached to an item such as a library book in a library circulation system. Although the system is described with particular reference to a library system, it is to be understood that the invention may be employed in any system in which the coded label is affixed to an item. The reader is designed to be self-positioning over the label surface in order to eliminate any misalignment of the code and reader apertures. The reader surface has side ridges which slide along the edges of the label and maintain proper alignment without the need for any auxiliary apparatus. The optical reader is extremely light weight, of simple design and is hand held by the operator for mechanical movement across the coded label surface. The reader is self-clocking to allow non-uniform relative motion between the reader apertures and the label. The optical reading surface is especially designed to reduce bulging of the label which may, for example, be attached to the back page of a library book.

The self-clocking hand held reader is used in conjunction with the coded label which bears an octal data field, a count field which provides a bit count for each horizontal row of the data count field and a third field which provides a parity check upon the bit count field. The optical apparatus includes an error checking circuit which insures that the computed count upon each row of the data field corresponds to the count actually read by the optical reader. In addition, the same counting logical circuitry provides a parity check signal which is compared to the parity bit read by the optical reader. The two separate error checking procedures insure a high reliability of correct data transfer between the coded label and the memory storage elements of the reader apparatus. The counting, comparing and parity checking circuits utilizes for each data row, a four bit synchronous counter, and three exclusive OR gates.

The reader comprises four separate light sources (LED's, for example) and four separate light detectors placed closely adjacent to the reader aperture. The reader does not utilize any fiber optics or high power light sources as in the prior art. The close positioning of the light source to the reader aperture allows for use of a low power source, and a relatively inexpensive photodetector. In addition, the use of a separate light source and a separate photodetector for each data row permits optimum matching of the light source and photodetector. Thus, any drifing which is inherent in the source or detector may be compensated by a proper match of the two elements. With only a single light source, relatively high power must be used to compensate for inherent drifting.

The light source of the preferred embodiment is an infra-red source which is advantageous since most inks have a light absorption characteristic which peaks in the infra-red.

BRIEF DESCRIPTION OF THE DRAWINGS

These and other objects of the present invention will be apparent to those skilled in the art upon consideration of the following detailed description taken in conjunction with the accompanying drawings, wherein.

DESCRIPTION OF THE PREFERRED EMBODIMENT

1. Optical Reader

Figures 1, 2, 3, 4, 5:
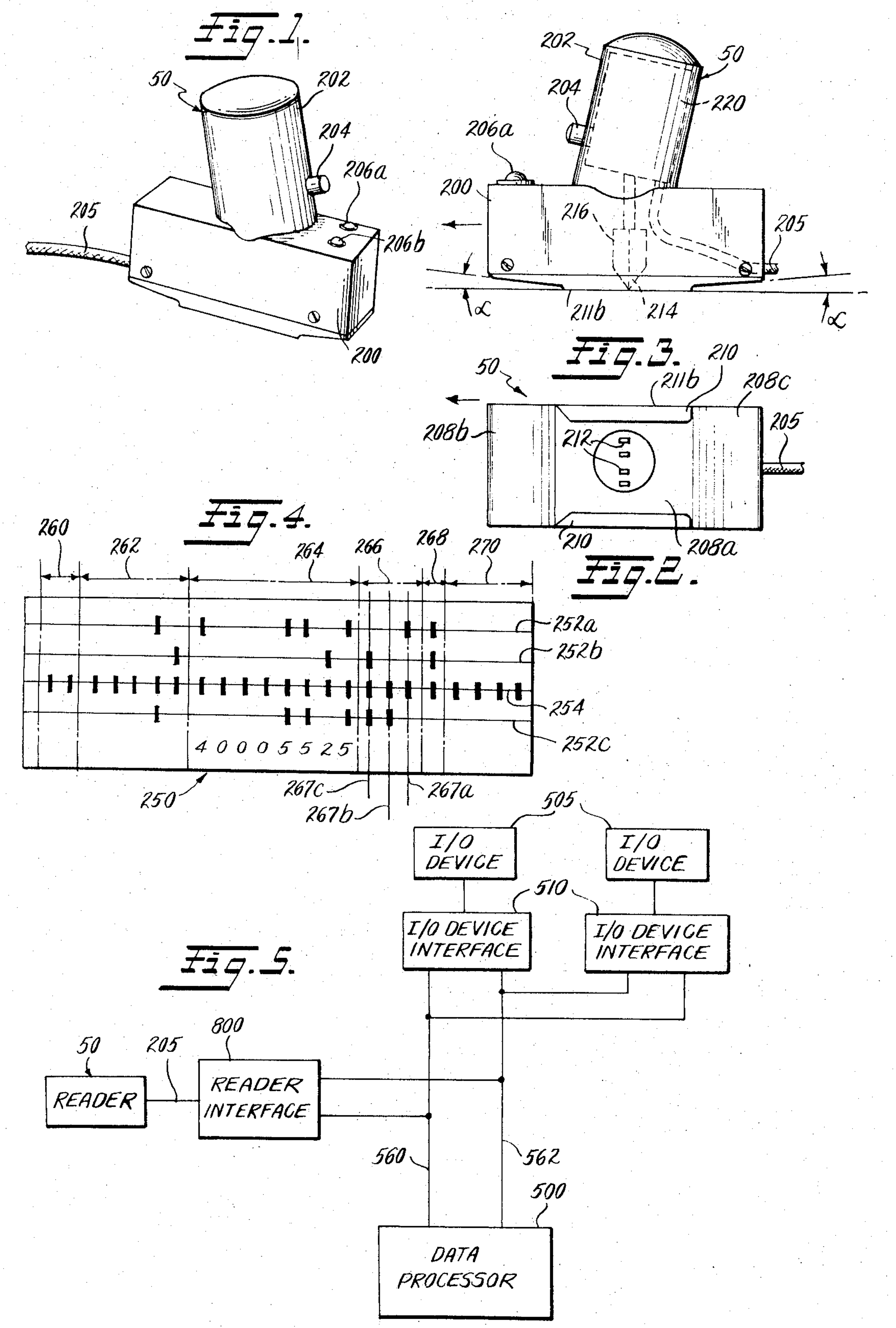
FIG. 1 is a perspective view of the optical reader.
FIG. 2 is a bottom plan view of the optical reader showing the contact surface and self-aligning means.
FIG. 3 is a side view of the optical reader showing the internal structure.
FIG. 4 is a plan view of an octal coded card.
FIG. 5 is a block diagram of a computer system using the optical reader apparatus.

The preferred embodiment of the optical reader is shown in detail in FIGS 1–3. The optical reader 50 comprises a lower housing 200 and an upper housing member 202. The upper housing 202 contains a reset button 204 which is depressed by the operator before reading each coded label. A cable 205 is attached to the lower housing to connect the optical reader to the reader interface and control circuitry. The lower housing 200 contains two light indicators 206*a* and 206*b* which are used to indicate that the code has been incorrectly read or is otherwise defective. As shown in FIG. 2, a horizontal contact surface 208*a* is bounded on each side by ridges 210 which form a recess into which the label is slidably secured during the reading process. Surfaces 208*b* and 208*c* of the reader are slanted an an angle $\alpha$ (shown in FIG. 3) with respect to the horizontal surfaces 208*a*. The arrows in FIGS. 2 and 3 indicate the direction of movement of the reader relative to the fixed label. The first or front slanting surface 208*b* provides a guide for any bulge in the paper on which the label is attached. Bulging of the paper may result from both horizontal and vertical forces applied by the operator to the reader during the reading of a label. The bulge will not hinder transverse motion of the reader because the slant given to the surface 208*b* reduces overall surface friction and permits the reader to flatten out the paper as it moves across the label. A second slanting surface 208*c*, rearwardly of surface 208*a* aids in reducing surface friction. The contact surface 208*a* contains a plurality of apertures 212 which are used both to project light onto the label surface and to receive the reflected light from the label as the optical reader is moved across the coded label.

FIG. 3 is a diagramatic side view of the optical reader showing a plurality of light sources 214 which may be, for example, light emitting diodes. A plurality of photosensitive detectors 216, such as optical transistors, are positioned to receive the reflected light from the label. In the preferred embodiment, the coded label uses an octal code together with one transfer or synchronization bit so that the optical reader contains four light sources and four photodetectors. One light source and one detector are allocated for each track or row of the coded label. The signals from each of the photodetectors 216 are sent to a plurality of line drivers 220 which feed the signals to the reader interface as explained below.

2. Coded Label

As illustrated in FIG. 4, the label comprises three rows of data bits: Row 252*a*, 252*b* and 252*c*. In addition, a fourth synchronization or transfer row 254 is interposed between rows 252*b* and 252*c*. Each row is scanned by the optical reader 50, and the photodetectors respond to the reflected light received through the apertures 212 of the contact surface 208*a*. The label also contains a series of human readable numbers corresponding to the unique number associated with each label. The label itself is divided into a number of sections or "fields." The first field 260 contains a reset code which is utilized to prepare the reader electronics to accept a valid code. A second field 262 contains a synchronization (sync) code which is common to all of the coded labels and is utilized to prepare the reader logic to accept the data code which follows. Field 264 contains the data digits associated with the unique octal number for each label. Row 252*a* is used to indicate the most significant octal digit and corresponds to the number 4 or 2hu 2. Row 252*b* corresponds to the number 2 or $2^1$ and row 252*c* corresponds to the number 1 or $2^0$ . As illustrated in FIG. 4, each column in field 264 represents a single digit of the octal code which corresponds to the printed number appearing at the bottom of each code column. The synchronization bits in row 254 are not part of the data information and are used for data transfer as explained below.

Field 266 contains a data bit count which is utilized to provide a horizontal bit count for each horizontal row of the data field 264. Data bit count field 266 thus provides a horizontal bit count check in which column 267*a* is the most significant digit and corresponds to $2^2 = 4$, column 267*b* corresponds to the next most significant digit with $2^1 = 2$, and column 267*c* contains the least significant digit with $2^0 = 1$. As illustrated in FIG. 4, row 252*a* of the count field 266 contains a single data digit in column 267*a*. Thus the value of the bit count in row 252*a* is 4, and corresponds to the four "set" data digits in row 252*a* of the data digit field 264. In row 252*b* the data bit count field 266 contains a single digit in column 267*c* which corresponds to the number 1 and represents the single data digit in row 252*b* of the data digit field 264. Likewise, row 252*c* contains the binary digit 3 represented by the "set" digits in column 267*b* and 267*c*. The number 3 corresponds to the three data digits in row 252*c* of the data digit field 264.

The coded label also incorporates an even parity check which is provided by the single column or field 268. This parity field provides an even parity for the data bit count in each row of the count field 266. This parity field is not associated with the parity of the data digits in field 264.

The final field 270 merely provides a number of additional synchronization bits in row 254 and aids in resetting the code for a new label scan.

The data format utilizing a horizontal bit count together with a parity check solely on the bit count provides for a highly accurate label reading procedure. Thus, any errors occurring in a particular row must occur in three separate places in order for the error to be properly read as a correct code. Thus, in order to have a successful read of an erroneous code, the three fields, namely the data field, the data bit count field, and the parity field must all be changed appropriately. Such an accidental label print or read is highly unlikely and the chances for a successful intentional label change are quite small.

The label 250 has a sticky layer of material on the non-coded side which allows the label to be easily affixed to an item such as a book, tape, or record cover.

3. Data Processing System

FIG. 5 is a block diagram of the data processing system in which the reader may be used. The system comprises a data processor 500 which may be a computer or a communication processor. A plurality of input-output (I/O) devices 505 are connected to their respective I/O device interface modules 510 which are in turn connected to the data processor 500 via an address bus 560 and a data bus 562. The data processor 500 interrogates each of the I/O interface modules over the address line 560 in order to either transmit data to the interface or receive data from the interface. The data itself is transmitted along the data bus 562. The data processor 500 may be part of a larger system which is used to transmit the data to and from various remote sites.

4. Reader Interface

Figure 6:
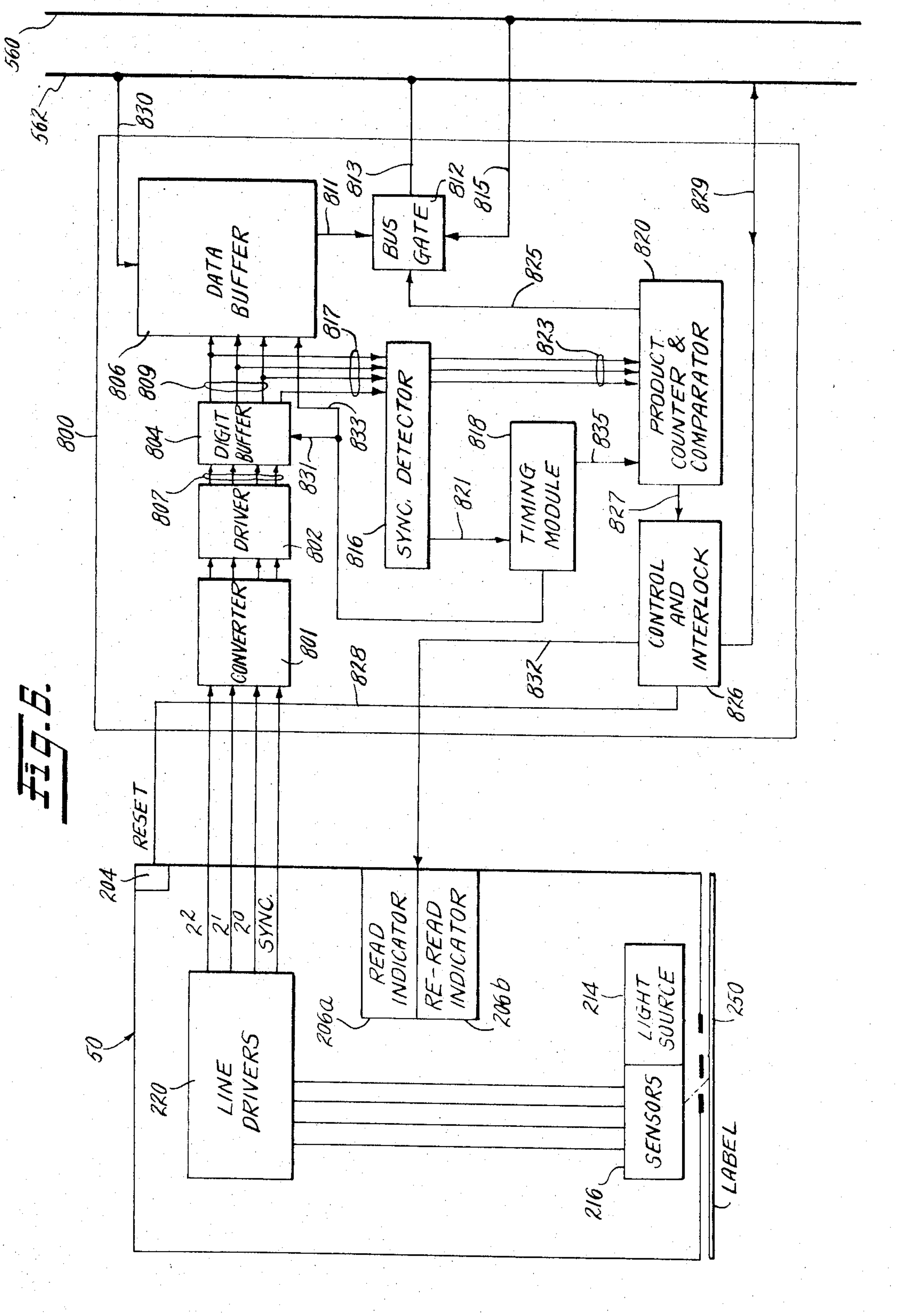
FIG. 6 is a block diagram of the reader interface.

Block diagrams of the reader and reader interface are shown in FIG. 6. The reader 50 is essentially as shown in FIG. 3 and comprises the four separate light sources 214 and the four photodetectors 216 which are connected to line drivers 220. Also shown in FIG. 6 are the reset switch 204, read indicator 206*a* and the re-read indicator 206*b.*

The three data bits and the transfer bit are transmitted to the reader interface 800 which comprises converters 801, digital line drivers 802, a four bit digit buffer 804 and an eight word data buffer 806. The converters 801 are used to obtain digital signals from the analogue reader inputs and may comprise for example. Fairchild $\mu$ A 734 differential comparators. The digit buffer 804 is connected to drivers 802 by means of lines 807 and to the data buffer 806 by means of lines 809. The modules 801 and 802 contain four converters and four line drivers respectively, one converter and one line driver for each channel. The data buffer 806 is connected by line 811 to a data bus gage 812 which in turn is connected to the data bus 562 by means of connecting lines 813. The data bus gate is strobed by the address bus 560 through the connecting lines 815. The outputs of the digit buffer 804 are fed to a sync code detector 816 by lines 817. Sync detector 816 is connected to a timing module 818 and a product counter and comparator circuit 820 by means of connectors 821 and 823 respectively. The product counter and comparator is coupled to the data bus gate 812 through line 825 and to a control and interlock module 826 by line 827. The reset control line 828 connects the reset switch 204 to the control and interlock module 826. The control and interlock module 826 is coupled to the data bus 562 via line 829 and to the read and re-read indicator over lines 832. A memory reset line 830 couples the data bus 562 to the data buffer 806. The timing module 818 is used to strobe the digit buffer 804, data buffer 806 and product counter and comparator 820, by means of lines 831, 833 and 835 respectively.

In operation the light sensors 216 detect the reflected light from the code which is imprinted on label 250. The line drivers 220 are then utilized to feed each of the analogue signals, i.e., the data bits and the sync bit, to the reader interface module 800. The data and sync bits are converted to a two level signal in the converter 801, and fed to digital line drivers 802. The bits are then sent to a digit buffer 804. The output of the digit buffer 804 is enabled for one microsecond at the trailing edge of the sync pulse. During this time all checks are made in the data and the digit buffer is cleared. The data is stored in the data buffer storage area 806. In the checking procedure, the sync detector 816 receives the data and sync pulse through data lines 817. The sync detector 816 first looks for the "sync code" which appears on the label 250 and which always preceeds the data digit field In particular, with reference to FIG. 4, the sync detector is responsive to the code appearing in the synchronization bit field 262. This sync code precedes the actual data bits appearing in the subsequent field 264. After identifying the sync code, the sync detector 816 feeds the subsequently read data to the product counter and comparator circuit 820 by means of data lines 823. The product counter and comparator 820 keep a running tabulation of the horizontal bit count for each of the three data rows. The sync detector 816 is also responsive to the synchronization or transfer bits. The sync detector strobes the timing module 818 through connecting line 821, and the timing module in turn provides clock pulses to the digit buffer 804, memory buffer 806 and the product counter and comparator 820.

After the eight digit data code has been read and the data stored in buffer 806, the data bit count field 266 (see FIG. 4) is read by the optical reader. The data bit count is transferred column by column to the product counter and comparator 820 in order to compare the count computer in the product counter circuit with that actually read by the optical reader. Any errors from the comparison are signaled over line 827 to the control and interlock module 826. The comparator also provides an inhibit signal over line 825 to the bus gate 812, and thus prevents any transfer from the data buffer 806 to the data bus line 562. If an error occurs during the reading, the control and interlock module 826 sends a signal over lines 832 to turn off the re-read indicator 206*b.* The absence of the re-read light indicates to the operator that the coded label was incorrectly read and must be read again. If no errors occur in the reading, both the re-read and read lights go out indicating a correct read. The operator then depresses the reset switch 204 to again energize lights 206*a* and 206*b* and reset interlock module 826 for a new read.

The product counter and comparator circuit 820 further provides for an even parity check on the data bit count field 266. The parity check field 268 (FIG. 4) is read by the optical reader, and the comparator circuit compares the computer parity with the parity actually read by the optical reader in order to detect any errors in the data bit count field. Errors in parity are similarly indicated to the operator by means of error lines 827 and 832, and the data is prevented from being transferred along the data bus 562 by means of data bus gate 812.

The control and interlock module 826 is connected to the data bus 562 and may be flagged by the processor 560 in the event the data which was read requires the operator to perform some special procedure before additional data can be read. Thus, if the code on the label 250 corresponds to an expired card number in a library circulation system, the processor will flag the reader and prevent further reading by locking the interlock module 826. The interlock may be reset only if the operator removes the flag by following prescribed procedures.

5. Product Counter and Comparator

Figure 7:
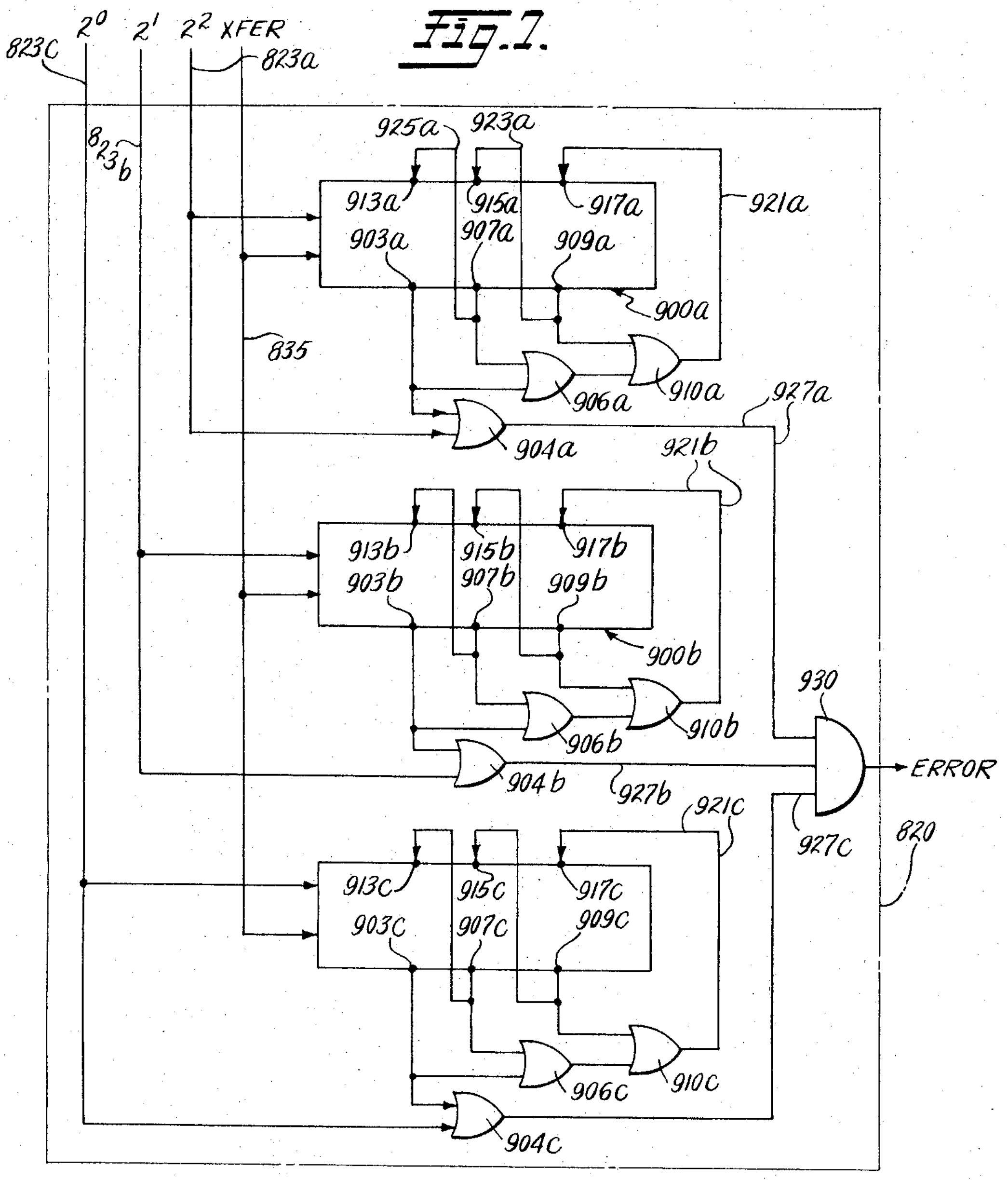
FIG. 7 is a schematic view of the product and comparator circuit of the reader interface.

The product counter and comparator circuit 820 of FIG. 6 is shown schematically in FIG. 7. The product counter and comparator circuit comprises three four-bit synchronous counters 900*a*, 900*b* and 900*c*, with each counter responsive to one row in the data field 264 of FIG. 4. Counter 900*a* is responsive to the most significant data row 252*a* of FIG. 4, and is connected to receive the data from line 823*a*. Likewise counter 900*b* is connected to line 823*b* in order to receive the data from the coded row 252*b*, and the counter 900*c* is connected over line 823*c* to receive data from the coded label row 252*c*. Each of the counters is also connected to a clock or transfer strobe from the timing module 818 over line 835.

Each of the three counters is connected in identical comparison circuits. Only the first comparison circuit connected to counter 900*a* will be described in detail. The first bit output point 903*a* is connected to a first input of an exclusive OR gate 904*a*. The second input of OR gate 904*a* is connected to the most significant data bit over line 823*a*. The output of connection point 903*a* is also fed to a first input of exclusive OR circuit 906*a*. A second input to the exclusive OR gate 906*a* is provided by the second bit output connection point 907*a*. A third bit output connection point 909*a* provides an output which is fed to a first input of exclusive OR gate 910*a*. The output of OR gate 906*a* is fed to the second input of OR gate 910*a*. The comparator circuit 900a has three input bit connection points 913*a*, 915*a*, and 917*a*. The output of the exclusive OR gate 910*a* is fed to the third bit input terminal 917*a* by means of connecting wire 921*a*. The output terminal 909*a* is connected to input connection point 915*a* by connecting wire 923*a*, and the output terminal 907*a* is connected to the input terminal 913*a* by connecting wire 925*a*. The output of exclusive OR gate 904*a* is connected to inclusive OR gate 930 via connector 927*a*.

The remaining two counter and comparator circuits are connected identically to the circuit connections described above.

Figure 8:
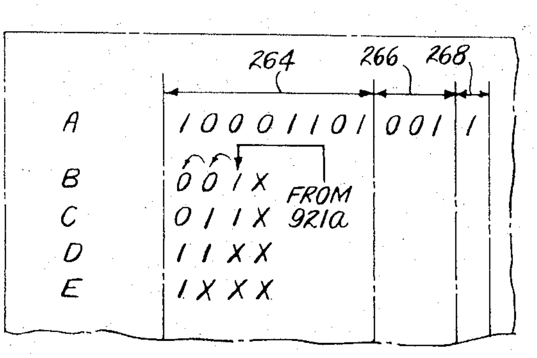
FIG. 8 is a diagram of the counter register status during various stages of the operation of the circuit of FIG. 7.

The operation of the counter and comparator circuit is best described in reference to FIG. 8 as well as to FIG. 7. The first row labeled row A of FIG. 8 illustrates an example of the data code as appearing on a given row, e.g., 252*a* of the coded label as shown in FIG. 4. The data field 264 contains eight bits, the product count field 266 contains three bits and the parity count field 268 contains the single parity bit. Row B illustrates the state of the counter 900 after data bit field 264 of row A is correctly read. The counters 900*a*–900*c* are incremented every time a "set" bit is detected in the respective individual rows 252*a*–252*c*. Thus the total count in the data field as represented in row A in FIG. 8 is 4. Thus one "set" bit appears in row B in the third counter register which corresponds to $2^2 = 4$. Row B contains a zero in the first or least significant bit register, a zero in the second bit register and a 1 in the third or most significant bit register. The fourth bit register is shown labeled X which indicates that the fourth bit register is insignificant and not utilized in the logic circuitry. The X's shown in rows C, D and E of FIG. 8 also indicate that the register state, at that point in the logical process is immaterial.

When the optical reader begins to read the data bit count field 266, the state of the least significant bit register is compared with the first bit position read. This comparison is done in the exclusive OR gate 904*a*. Thus if the signal on line 823*a* and the signal coming from terminal 903*a* are not identical, the exclusive OR gate 904*a* produces an output signal along line 927*a* to gate 930, thus indicates an error. The error signal is fed to the control and interlock module 826 (FIG. 6) and provides an inhibit signal along line 825 to the data bus gate 812.

Assuming there is no error in the least significant bit position of the count field 266, the data clock and transfer strobe provides an enabling pulse along line 835, to the counter 900*a*. At this point the state of the bit registers are shifted as indicated by the arrows in row B of FIG. 8. The first bit register which corresponds to the least significant bit position, is shifted out of the counter 900*a* and the second bit register state is transferred to the first bit register. This transfer is accomplished between output terminal 907*a* and input 913*a* by means of connecting wire 925*a*. Likewise the third bit register state, which is the most significant bit position, is shifted to the second bit register. This shift is accomplished between output terminal 909*a* and input terminal 915*a* by means of connecting wire 923*a*. The third or most significant bit register is reset by means of a signal transferred along wire 921*a* from the output of exclusive OR circuit 910*a*. The two exclusive OR circuits 906*a* and 910*a* serve to compute the parity associated with the three data bits in the data count field 266. Thus, in the present example an even parity requires that a "one" be transferred to the third significant bit position along line 921*a*. The two exclusive OR gates 906*a* and 910*a* accomplish logical parity computations. The output of the exclusive OR circuit 906*a* provides a logical zero output which is fed into one input of the exclusive OR gate 910*a*. The second input of exclusive OR gate 910*a* is provided by the output terminal output 909*a* and corresponds to a logical one. Thus, the output of exclusive OR gate 910*a* is a logical one corresponding to an even parity for the data bit count field 266. The two exclusive OR gates 906*a* and 910*a* always provide for an even parity bit to be transferred to the third register of counter 900*a* at input terminal 917*a*.

Row C of FIG. 8 represents the state of the counter 900*a* after the shift and parity transfer has occurred. The first bit register in row C corresponds to a logical zero which is then compared to the next data count bit read by the optical reader in count field 266. This comparison is again done in exclusive OR gate 904*a*, and any error is signaled along line 927*a* to gate 930. Row D represents the state of the register 900*a* after a second shift and parity transfer has occurred. In this case, however, the third bit position as well as the fourth bit position is represented by an X since the state of these registers is now irrelevant. Row E represents the state of the register 900*a* after the third and last shift and parity transfer has occurred. In this case the parity bit occupies the first bit register since the remaining product codes have been transferred out of the register after first being compared to the code read by the optical reader using the exclusive OR gate 904*a*. The parity bit occurring in field 268 is now read by the optical reader and compared to the computed parity bit in the exclusive OR gate 904*a* to provide a parity check count on the data bit count code of field 266.

The procedure described above for counter 900*a* is simultaneously duplicated by the counters 900*b* and 900*c* which operate upon rows 252*b* and 252*c* of the code respectively. The three error signals from lines 927*a*, 927*b* and 927*c* are connected to exclusive OR gate 930 to provide output error signals to the control and interlock module 826 and the data bus gate 812.

Although the invention has been described with reference to the preferred embodiment, it is understood that certain modifications and improvements may be evident to those skilled in the art and the invention is intended to cover all modifications which do not depart from the spirit and scope of the invention.

We claim:

1. A coded label for use in a code reading apparatus, said label having three coded fields comprising:

a. *n* + 1 rows of indicia on each of said coded fields,
b. said first field having n rows of indicia forming *m* columns of coded data,
c. said second field having n rows of coded indicia, each coded row of said second field indicating the number of indicia in corresponding rows of said first field,
d. said third field having n rows of indicia for providing a parity checking means on said rows of said second field, and
e. a row of synchronization indicia for each of said fields.

2. A coded label as recited in claim 1 wherein said indicia are marks on said label being readable by an optical reader.

3. A coded label as recited in claim 2 wherein said coded label has two straight edges for aligning said label with the optical reader.

4. A coded label as recited in claim 1 wherein said m columns of said first field contain indicia in an octal code.

5. A coded label as recited in claim 4 wherein said n rows of said second field contain indicia in an octal code.

6. A code reading apparatus for recording and checking an n row coded label comprising:

a. a code reader means for reading said coded label and providing signals indicative of said code to a code storage means,
b. counter means connected to said code reader means and having a plurality of bit registers for registering the number of signals corresponding to the number of indicia on a first part of the rows of said label,
c. means connected to said counter means for sequentially comparing signals from each bit register of said counter means with signals from said reader means corresponding to indicia on a second part of the rows of said label which represent a coded number on said label,
d. means connected to said comparing means for indicating a non-identity between said registered bit signals and said signals corresponding to said coded number,
e. logic means connected to said counter means for providing a signal corresponding to the parity of the bit registers of said registered number for registration in said counter means, whereby said registered parity signal is compared in said comparing means to a parity signal from said reader means corresponding to parity indicia on rows of said label and any non-identity is indicated by said indicating means.

7. A code reading apparatus as recited in claim 6 wherein said counter means comprises a shift register and said comparing means is connected to one bit register of said shift register.

8. A code reading apparatus as recited in claim 6 wherein said comparing means comprises an OR gate.

9. A code reading apparatus as recited in claim 6 wherein said logic means comprises two OR gates.

10. A code reading apparatus as recited in claim 6 wherein said code label contains n rows of indicia and wherein said apparatus comprises:

a. *n* of said counter means,
b. *n* of said comparing means, and
c. *n* of said logic means, whereby each counter means, comparing means and logic means is responsive to signals form said reader corresponding to indicia from one of said *n* coded rows.

11. A code reading apparatus as recited in claim 6 wherein said reader is an optical reader and said indicia are marks on said coded label.

12. A code reading apparatus as recited in claim 6 wherein said indicating means comprises a light source.

13. A code reading apparatus as recited in claim 12 further comprising means connected to said comparing means for confirming a correct label read.

14. A code reading apparatus as recited in claim 13 wherein said confirming means comprises a light source.

* * * * *